Patented Oct. 16, 1934

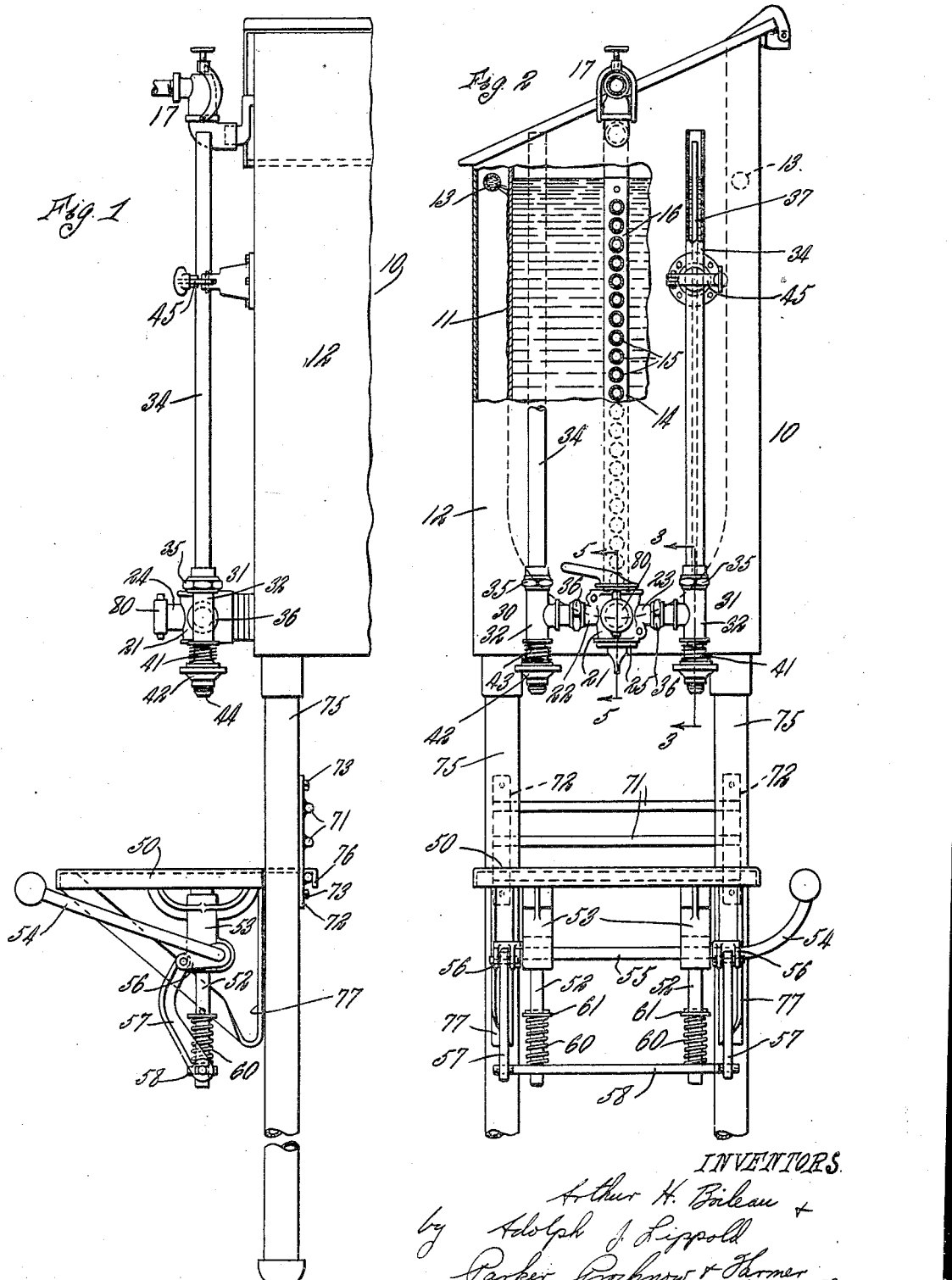

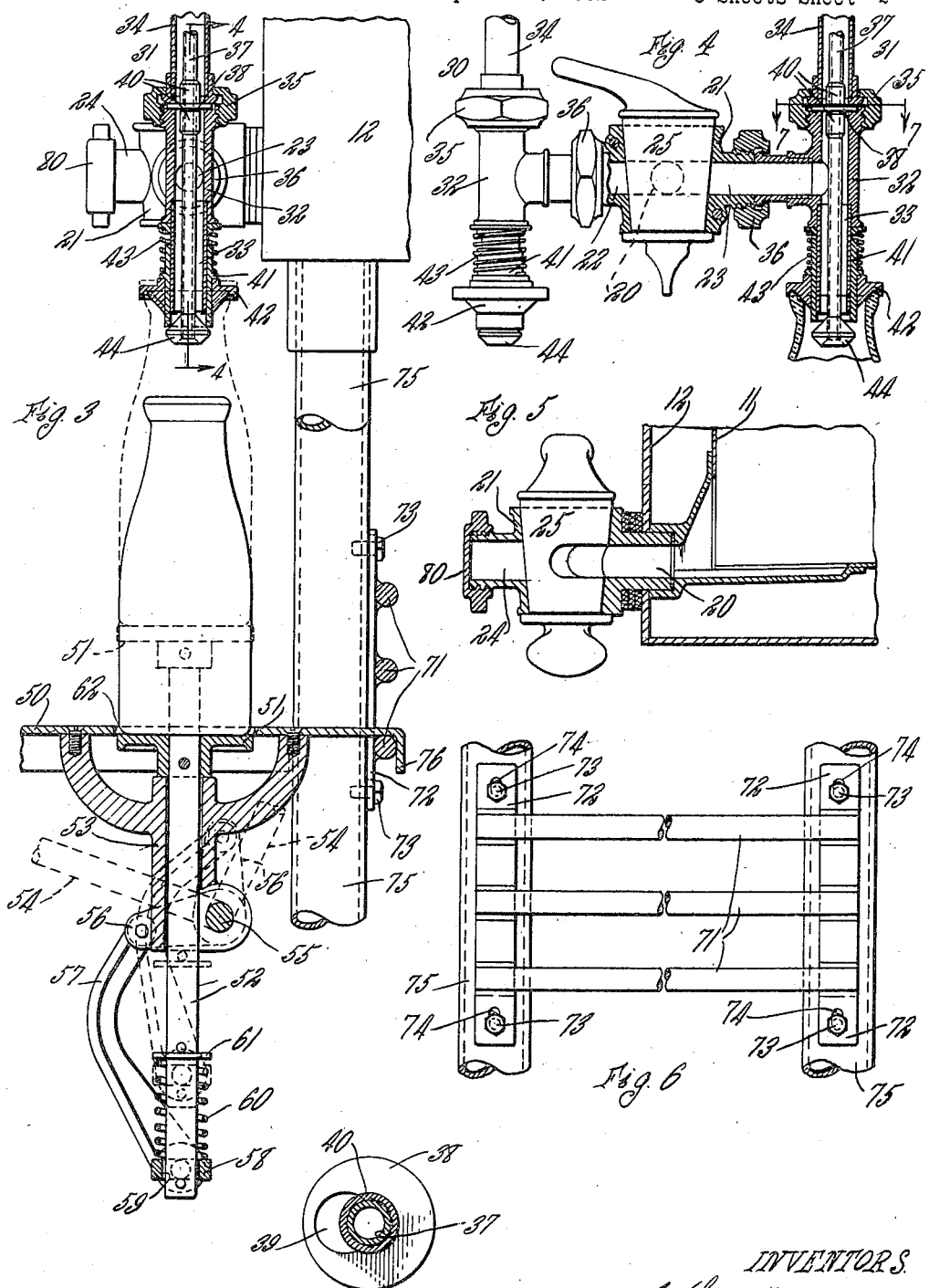

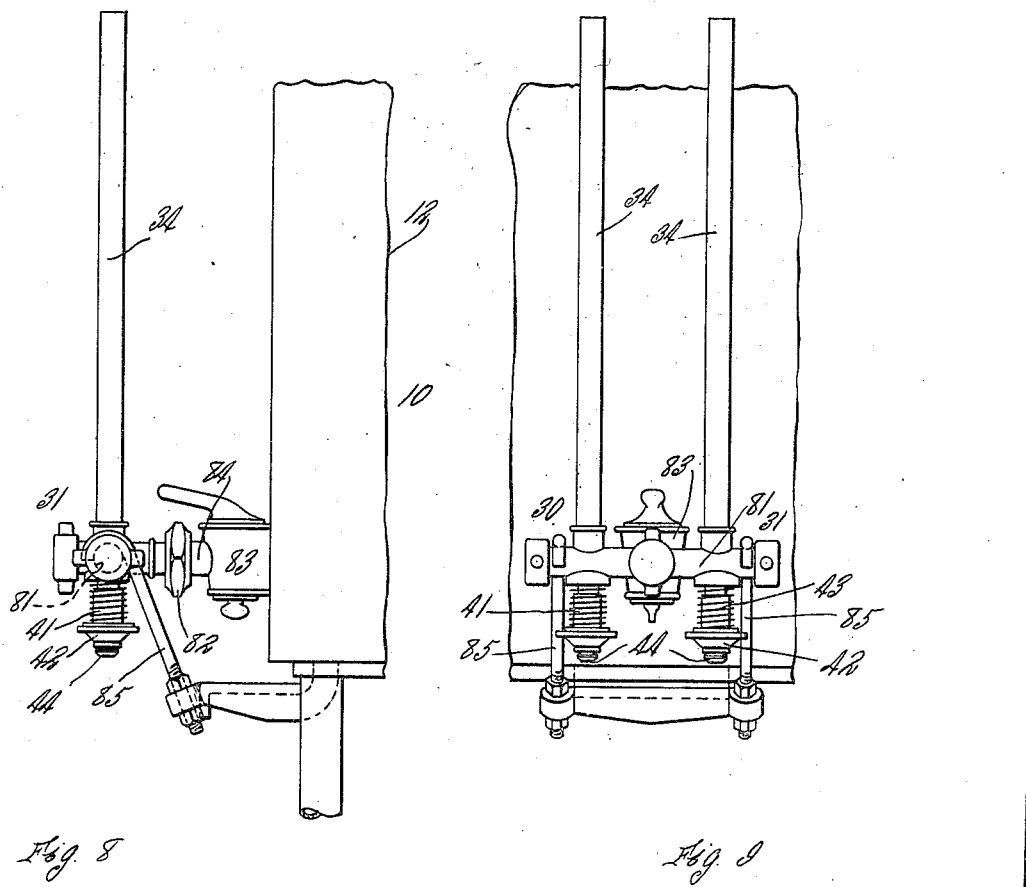

1,976,768

UNITED STATES PATENT OFFICE 1,976,768

LIQUID TREATING AND BOTTLING APPARATUS

Arthur H. Boileau, Cedar Rapids, Iowa, and Adolph J. Lippold, Milwaukee, Wis., assignors to Cherry-Burrell Corporation, Wilmington, Del., a corporation of Delaware Application April 16, 1932, Serial No. 605,666

9 Claims. (Cl. 226—70)

This invention relates to liquid bottling apparatus and particularly to a combined pasteurizer and bottle filler for liquids such as milk.

At the present time, the ordinary small or farm dairy is equipped with a small milk cooler, usually a surface cooler, by which the milk is cooled before it is run into the pasteurizer, which is a machine separate from the cooler. The coolers are commonly provided with covers which have to be taken down and which, as well as the other parts of the coolers, have to be cleansed. After heating and holding the milk in the pasteurizer for the period of time necessary for pasteurization, the milk is discharged or delivered to the cooler, and this generally involves a pump and suitable sanitary pipes and fittings for pumping the milk to the top of the cooler. Then from the bottom trough or discharge of the cooler the milk flows or is delivered through other pipes or connections to the tank or reservoir of the bottle filler from which is it bottled. Such apparatus thus includes a number of separate machines and operations. Space is required for these machines and labor is involved in taking apart, cleaning, sterilizing and reassembling the machines and milk connections, which must be done after each run of the milk in order to keep the apparatus in the proper sanitary condition.

One object of this invention is to produce an efficient combined pasteurizer and bottle filler of novel and practical construction by means of which the small dairyman is provided with a complete milk plant in one machine, in the use of which he can pour the milk into the vat of the pasteurizer directly from the milk pails and cool it and keep it cool until the next milking or until he is ready to pasteurize the milk, when he can heat the milk to and hold it for the required time at the pasteurizing temperature in the same vat, then cool it again to proper bottling temperature and then bottle the milk directly from this same vat by means of a bottle filling device with which the pasteurizer is equipped.

Other objects of the invention are to provide a pasteurizer equipped with a bottle filler located exteriorly of the pasteurizer vat and connected to the milk outlet of the vat in such a manner that the bottle filler can be readily taken apart, cleansed, and reassembled, or can be readily removed from the pasteurizer in case it is desired to use the pasteurizer without the bottle filler; also to provide the apparatus with bottle filling mechanism adapted for filling the bottles two at a time, but which can be readily arranged, if desired, to fill the bottles one at a time, or to permit the milk to be delivered from the pasteurizer to a cooler, can filler, or other apparatus when the milk is not to be bottled; also to provide the bottle filling mechanism with bottle holding and lifting means which can be readily adjusted to suit different sized bottles either of standard or non-standard sizes; also to provide bottling apparatus in which the bottle filling devices are arranged in a readily accessible novel manner exteriorly of the liquid holding vat; also to mount the bottle holding and lifting mechanism so that it can be readily removed from the apparatus when not in use; and also to improve apparatus of the character mentioned in the other respects hereinafter described and set forth in the claims.

In the accompanying drawings:

Fig. 1 is a fragmentary, side elevation of a combined pasteurizer and bottle filling apparatus embodying the invention.

Fig. 2 is an end elevation, partly in section, thereof.

Fig. 3 is a fragmentary side elevation of the apparatus on a larger scale, showing the bottle filling mechanism in section on line 3—3, Fig. 2.

Fig. 4 is a fragmentary elevation of the filling devices partly in section on line 4—4, Fig. 3.

Fig. 5 is a sectional elevation on an enlarged scale on line 5—5, Fig. 2.

Fig. 6 is a rear elevation of the adjustable supporting frame for the bottle lifting mechanism.

Fig. 7 is a sectional plan view on line 7—7, Fig. 4, showing the vent tube of one of the filling devices and its supporting disk.

Figs. 8 and 9 are respectively side and end elevations showing a slightly modified arrangement of the filling devices.

First referring to the construction shown in Figs. 1–7, 10 represents a vat or tank adapted to hold a body of liquid, which will be hereinafter referred to as milk, since the apparatus is primarily designed for pasteurizing and bottling milk, but it is not thereby intended to restrict the invention to such use. The vat is preferably equipped with means for heating the milk to and holding it at the pasteurizing temperature, and also with cooling means adapted to be used either for cooling the milk before pasteurizing it or for cooling the pasteurized milk down to the necessary temperature for bottling or other purposes. The vat 10 may be, as shown in the drawings, a combined coil and spray vat pasteurizer of the construction fully disclosed in application for U. S. Patent, Serial No. 569,896, filed Oct. 20, 1931, by Harvey Feldmeier. Briefly described, this vat pasteurizer comprises a metal lining or receptacle 11 surrounded by an insulating jacket or outer casing 12, the walls of which are spaced from the walls of the lining 11. The milk in the lining 11 is adapted to be heated by means of hot water or other liquid sprayed or discharged onto the outer surfaces of the lining 11 from spray pipes 13 arranged in the upper portion of the spaces between the lining 11 and jacket 12 so that the water discharged from the pipes flows down over the outer surfaces of the lining 11 into the bottom of the jacket, from which it is discharged or recirculated by means not shown. Two spray pipes 13 for this purpose are shown located in the spaces at the opposite sides of the vat between the side walls of the lining and the jacket. In the ordinary operation of the apparatus, the spray water from these pipes 13 is used for heating the milk to the pasteurizing temperature, and the milk is held at this temperature in the vat for the length of time necessary for pasteurization. The vat is also equipped with a coil 14, arranged so as to be submerged in the milk in the vat, and so that water, brine, or other suitable cooling medium is adapted to be circulated through it for cooling the milk. This cooling coil may be removably supported in the vat and composed of horizontal pipes 15 connected at their ends to headers 16 adapted for connection to suitable supply and discharge pipes (one of which is shown at 17, Fig. 1) and constructed so that the cooling medium delivered to one of the headers will circulate through the several horizontal pipes of the coil and discharge from the coil through the other header.

While a vat of the described construction is desirable, the vat could be of other construction adapted for heating or cooling the milk.

The vat is provided with a suitable outlet or connection 20 through which the milk is discharged from the lining or receptacle 11 and this outlet is furnished with a suitable valve for controlling the discharge of the milk. As shown, this outlet comprises a three way turn-plug valve 21 of ordinary form connected by a pod or fitting to the vat lining 11, the casing of this valve 21 being provided with three discharge branches or ends, two of which, 22 and 23, extend from opposite sides of the casing and the third 24 projects forwardly from the casing. The passages of these three discharge ends lead from the plug chamber or seat of the valve so that by turning the plug 25 to appropriate positions the milk can be discharged from the vat, either through the side or front outlets of the valve.

As disclosed in Figs. 1–7 of the drawings, two bottle filling heads or devices 30 and 31 are provided, each connected with one of the side ends 22, 23 of the outlet valve 21. Each of these bottle filling devices, which are alike, comprises an upright tube or stand-pipe, which communicates with one side branch of the outlet valve 21, an upright vent tube arranged within the stand pipe and a discharge valve at the lower end of the device. The stand pipe, as shown, is built up of a T-fitting 32, a section of pipe 33 which is secured to and extends downwardly from the lower end of the T, and an upper pipe section 34, which is removably secured to the upper end of the T 32 by a screw coupling or union 35 whereby the upper pipe section 34 can be detached from the T. The lateral end of the T is detachably secured by a suitable union 36 to the side branch of the outlet valve 21. The vent tube 37 is removably secured centrally within the stand pipe, preferably by means of a circular disk 38, which is clamped between the upper pipe section 34 and the upper end of the T 32. This disk has a slot 39 through which the vent tube passes, this slot, see Fig. 7, being of key hole form having a narrow portion adapted to embrace the vent tube between collars 40 thereon. The other portion of the slot is wide enough to pass over the collars so that when the upper pipe section 34 is detached at the union 35 and the disk 38 thus released, the vent tube can be shifted relatively in the slot 39 until the collars 40 on the tube register with the wide portions of the slot 39 which permits the vent tube to be disengaged from the disk and pulled downwardly out of the stand pipe. Slidably mounted on the lower pipe section 33 is the usual spring pressed valve sleeve 41 provided with a rubber or other suitable valve 42 adapted to yieldingly engage and close the mouth of a milk bottle. The lower end of this valve sleeve is normally held by its spring 43 against the usual conical head 44 at the lower end of the vent tube for preventing the discharge of milk from the stand pipe except when the valve sleeve is lifted by the upward pressure of a bottle thereon to permit the milk to enter the bottle.

The upper portion of the stand pipe is preferably releasably held securely in a suitable screw clamp or securing device 45 which is attached to the vat and aids in rigidly but releasably holding the filling device in place and relieving the outlet valve or connection 20 from undue strain in the bottle filling operation.

By reason of the described construction of the filling device, it can be built up of standard sanitary pipe sections and fittings, thus making the device of economical construction, and it is located exteriorly of the vat so that it is accessible and can be readily detached from the discharge valve of the vat and the parts of the device disconnected for ready and thorough cleaning.

In filling the bottles, they are supported and moved into and out of receiving relation with the filling devices by mechanism, which may be similar in construction and operation to the bottle supporting and lifting mechanism commonly employed in milk bottle filling machines. This mechanism, however, is detachably and adjustably mounted as will be now described. It comprises a table 50, which is stationarily supported beneath the filling devices, and a vertically movable bottle holder or plunger 51 beneath each filling device. Each plunger 51 shown is provided with a vertical stem 52 arranged to slide vertically in a guide or bearing 53 secured to the under side of the table. The plungers are lifted to raise the bottles to the filling devices by a lifting lever 54 connected to a rock shaft 55 which is suitably journalled on the bearings 53, or other parts fixed to the table, and is provided with rock arms 56 connected by links 57 to a cross bar 58 having holes 59 through which the lower ends of the plunger stems extend. Springs 60 surround the plunger stems between the cross bar 58 and collars or abutments 61 on the plunger stems. By swinging the lever 54 downwardly, the cross bar 58 is raised and, through the medium of the springs 60, lifts the plungers 51 so as to lift and yieldingly press the bottles supported on the plungers against and open the valve 42 of the filling devices. The plungers are so mounted on the table that when in their normal lowered position, the top faces of the plungers on which the bottles rest, are depressed slightly below the top face of the table 50 within circular openings 62 therein, through which the plungers move. The depressions, thus formed by the openings 62 and the tops of the plungers, provide shallow circular seats in which the bottles can be quickly and easily placed centrally on the plungers and in axial alignment with the filling devices so that when the bottles are raised, their mouths will be concentric with and properly engage the mouth closing valves 42 of the filling devices.

The table 50, with the bottle lifting mechanism carried thereby, as described, is removably and adjustably mounted in connection with the pasteurizing vat so that the table and bottle lifting mechanism, as a unit, can be mounted on, and removed from, the pasteurizer. Preferably for this purpose a table supporting grid or frame, comprising three spaced horizontal cross rods 71 rigidly attached to vertical end bars 72, is adjustably secured to a stationary part of the pasteurizer as, for instance, by means of screws 73 passing through vertically elongated slots 74 in the end bars and screwed into threaded holes in two of the supporting legs 75 of the pasteurizing vat. The table 50 is provided at its rear end with a down-turned flange or portion 76 adapted to be hooked over one or another of the rods 71 and the table also has depending rigid brackets 77 adapted to bear against the front sides of the legs 75 whereby the table is removably held in connection with the legs. The table may be thus secured at the different elevations suitable for filling standard quart, pint, or half-pint bottles by engaging its flange 76 with one or another of the cross rods whereas the adjustment of the supporting frame 71 on the legs afforded by the screws 73 and slots enables additional vertical adjustment of the table appropriate for locating it at proper elevations for filling bottles, which are not of standard size.

In the operation of the described apparatus for pasteurizing and bottling milk, the pasteurizer vat is filled with milk to the desired level and the milk is heated by water discharged from the spray pipes 13 until the milk reaches the prescribed pasteurizing temperature. The milk is held in the vat at this temperature for the period of time necessary to effect proper pasteurization. It is then cooled while still remaining in the vat, preferably by circulating a suitable cooling medium through the cooling coil 14 in the vat. The milk is then ready for bottling, for which purpose the discharge valve 21 of the pasteurizer is opened to permit the milk to enter the stand pipes 30, 31. The bottles are then filled, as in the use of the ordinary filling machine, by placing the bottles on the lifting plungers 51 and operating these, as explained, to lift the bottles into engagement with the sliding valves of the filling devices and raising the valves by continued upward movement of the bottles to cause the milk to discharge into the bottles. The air displaced from the bottles by the milk escapes through the vent pipes, and any foam or surplus milk can also pass up through the vent tubes and escape from their upper ends into the stand pipes, which constitute, in effect, supplemental reservoirs for the milk. The bottles when filled are lowered out of engagement with the filling valves, which are then closed by their springs. It will be understood that, when it is necessary to cool the milk before pasteurizing it, the milk may be poured into the pasteurizer vat 11, cooled, as explained, to the proper temperature and retained at this temperature in the vat until the vat is filled to the desired level with milk from successive milkings, or until the time when the milk is to be pasteurized.

The above described bottling operation applies to the simultaneous filling of two bottles. If it is desired to fill the bottles one at a time, then preferably one of the filling devices is removed by detaching it from the discharge valve 21 at the union 36 and from the holding clamp 45 for the upper portion of the stand pipe and closing that end of the valve 21 from which the filling head has been removed by means of an ordinary screw cap, such as the cap 80 shown for closing the front outlet 24 of the valve. When it is desired to use the apparatus for pasteurizing, heating or cooling only, without bottling, both filling devices can be removed and the bottle table and lifting mechanism also removed from the pasteurizer and the milk can be run from the pasteurizer to a separate cooler, container or other apparatus, either through one of the side ends 22 or 23 of the outlet valve, the other end being closed by a screw cap or, if preferred, both of the side ends of the valve 21 can be thus closed and the milk can be discharged from the front end 24 through a suitable pipe or connection coupled thereto.

The modified construction disclosed in Figs. 8 and 9 may be the same as that described with the exception that the two stand pipes 30 and 31 of the two filling units or heads are connected to a common cross manifold 81, which may be coupled by a lateral branch or nipple and union 82 to the front end of the outlet valve of the pasteurizer. With this arrangement, an outlet valve with the lateral discharge branches or ends, before described, is not necessary and a simple straight way valve 83, having a single front discharge end or outlet 84, may be employed. By this construction, both filling devices may be removed or attached as a unit by means of a single coupling or union 82 joining the cross manifold to the outlet valve 83. Hook bolts 85 are shown secured to a stationary part of the pasteurizer and engaging over the manifold 81 to relieve the outlet valve and connection from undue strain in the bottling operation.

Claims:

1. A combined pasteurizer and bottling apparatus comprising a vat provided with means for changing the temperature of the liquid in the vat as required and provided with a valve controlled bottom outlet for the liquid, a bottle filling device mounted on said pasteurizer exteriorly of said vat and in connection with said liquid outlet outwardly beyond the valve controlling the outlet, means for removably supporting a bottle in receiving relation to said filling device, and a valve for controlling the discharge of liquid from said filling device into the bottle, said first mentioned valve being operable to discharge the vat independently of said filling device.

2. A combined pasteurizer and bottling apparatus comprising a vat provided with means for heating and cooling the liquid in the vat as required and provided with an outlet for the liquid, a valve controlling said outlet, a bottle filling device detachably mounted on said pasteurizer exteriorly of said vat and comprising a liquid-holding stand pipe removably connected with said liquid outlet, and a valve for controlling the discharge of liquid from said filling device into a bottle, said valves being arranged and operable at will to discharge the liquid from the vat either directly through said outlet or through said filling device.

3. The combination of a liquid holding vat provided with an outlet for the liquid, a bottle filling device mounted exteriorly of said vat comprising a stationary liquid-holding stand pipe connected with said liquid outlet, an air vent tube stationarily but detachably mounted within and supported by said stand pipe and removable therefrom, and a valve mounted on said stand pipe and cooperating with said next tube for controlling the discharge of liquid from said filling device into a bottle.

4. A combined pasteurizer and bottling apparatus comprising a vat provided with means for changing the temperature of the liquid in the vat as required and provided with an outlet for the liquid, a bottle filling device mounted on said pasteurizer exteriorly of said vat comprising a stationary liquid-holding stand pipe connected with said liquid outlet and rising to a height to hold the liquid therein to the level of the liquid in the vat, an air vent tube stationarily mounted within said stand pipe, and a valve cooperating with said vent tube for controlling the discharge of liquid from said stand pipe into a bottle, said vent tube providing a passage opening at its upper end into the stand pipe below the top of the latter for delivering foam and liquid displaced from the bottle into said stand pipe during the bottle filling operation.

5. The combination of a liquid holding vat provided with an outlet for the liquid, a bottle filling device mounted exteriorly on said vat and directly connected with said liquid outlet, a shelf, a shelf support mounted in connection with said vat and having parts positioned at different elevations for engagement by said shelf, bottle lifting mechanism comprising said shelf removably engageable with said parts of said shelf support for mounting said shelf at different predetermined definite elevations on said support to suit bottles of different standard sizes, and including a bottle holder movable to place bottles into and out of receiving relation to said filling device, said shelf support being also adjustable with said shelf and bottle holder vertically relatively to said filling device to suit bottles varying from standard sizes.

6. A combined pasteurizer and bottling apparatus comprising a vat provided with means for heating and cooling the liquid in the vat as required and provided with an outlet for the liquid, a valve controlling said liquid outlet, a bottle filling device arranged exteriorly of said vat and removably connected to said liquid outlet outwardly beyond said valve, and a valve for controlling the discharge of liquid from said filling device into a bottle in receiving relation to said filling device, said first mentioned valve being operable to discharge the vat through said outlet independently of said filling device.

7. A combined pasteurizer and bottling apparatus comprising a vat provided with means for changing the temperature of the liquid in the vat as required and provided with an outlet for the liquid, a valve controlling said liquid outlet, a plurality of bottle filling devices mounted exteriorly of said vat and removably connected to said liquid outlet outwardly beyond said valve, a valve independently controlling the discharge of liquid from each filling device, and means for simultaneously presenting bottles to said filling devices, said first mentioned valve being operable to discharge the vat through said outlet independently of said filling devices.

8. A combined pasteurizer and bottling apparatus comprising a vat provided with means for changing the temperature of the liquid in the vat as required and provided with an outlet for the liquid, a valve controlling said liquid outlet, a plurality of bottle filling devices mounted exteriorly of said vat, a common manifold connecting said bottle filling devices to said liquid outlet outwardly beyond said valve and removable therefrom with the filling devices as a unit, and a separate valve controlling the discharge of liquid from each of said filling devices, said first mentioned valve being operable to discharge the vat through said outlet independently of said filling devices.

9. The combination of a liquid holding vat provided with means for heating and cooling the liquid and having a valved bottom outlet for the liquid, a bottle filling device mounted exteriorly of said vat and comprising a liquid-holding stand pipe connected with said vat outlet outwardly beyond the valve thereof, and a valve controlling the discharge of the liquid from said filling device into a bottle, said valved outlet being operable to discharge the vat therethrough independently of said filling device.

ARTHUR H. BOILEAU,
ADOLPH J. LIPPOLD.